April 18, 1939.  J. KING  2,155,275
OPENING ROOF FOR VEHICLE BODIES
Filed May 21, 1937  2 Sheets-Sheet 1
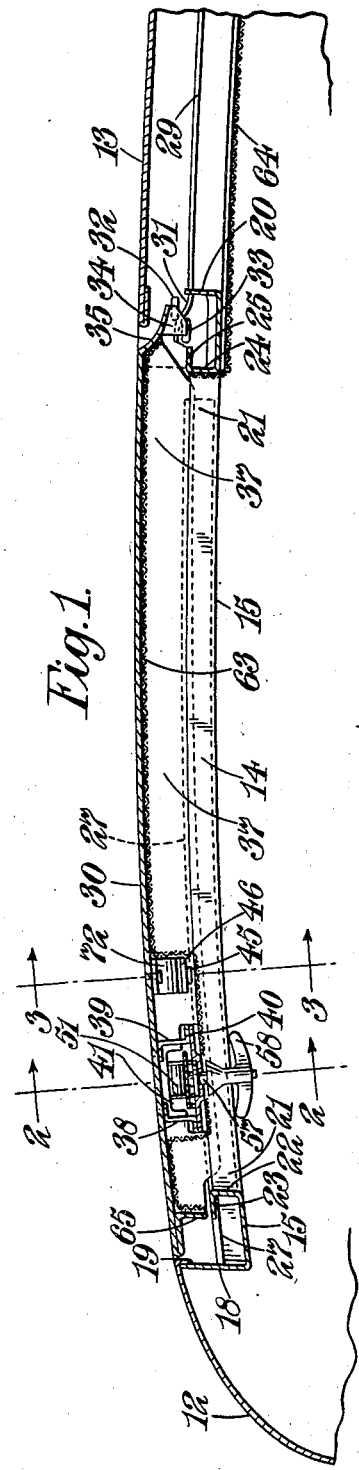

April 18, 1939. J. KING 2,155,275
OPENING ROOF FOR VEHICLE BODIES
Filed May 21, 1937 2 Sheets-Sheet 2

Patented Apr. 18, 1939

2,155,275

UNITED STATES PATENT OFFICE 2,155,275

OPENING ROOF FOR VEHICLE BODIES

John King, London, England

Application May 21, 1937, Serial No. 143,896
In Great Britain August 11, 1936

13 Claims. (Cl. 296—137)

This invention comprises improvements in or relating to opening roofs for vehicle bodies.

It is an object of the invention to provide means for permitting a sliding panel, adapted to close an opening in the roof, to be clamped at any position in its sliding movement, which clamping means will operate effectively notwithstanding any lack of exact parallelism between the guides which support the sliding panel and which locking means will permit the device to be moved smoothly in all positions when unlocked. It is a further object of the invention to provide a construction of sliding panel and mounting therefor which is adaptable for use in all metal vehicle bodies, which is free of rattle, which does not let water in rainy weather, which is easily adjusted and locked and which is light and easily handled.

According to one feature of the invention there are provided below a roof opening guide flanges along opposite sides of the roof opening having upper and lower surfaces substantially parallel to the roof surface, a sliding panel adapted to close said roof opening and supported to move fore and aft on one of the surfaces of said guide flanges, a locking lever pivoted upon the panel adjacent to each of the flanges and so shaped as to engage the opposite face of the flange from that upon which the panel slides and means to press said locking lever into locking engagement with the flange when desired. The locking lever may be curved so as to come into engagement with the underside of the guide flanges; preferably there are two levers and preferably they are located so that they depend within the guide flanges and are locked by being forced outwardly by means of a pair of transverse bolts and means to shoot the same mounted upon the panel.

The locking lever it will be seen co-operates with the panel itself, the panel pressing upon one face, preferably the upper face of the guide-members and the locking levers pressing upon the opposite or underneath face. If the guide flanges are not perfectly parallel with one another this makes no difference to the action of the locking device, whereas devices which operate on the vertical edges of guide flanges necessarily require the flanges to be located with great precision in order to ensure that they will work properly.

According to a further feature of the invention the hereinbefore mentioned sliding panel which is adapted to close the roof opening is provided with downwardly depending flanges which are so spaced as to lie close to and overlap upwardly extending flanges on a water-check tray which surrounds the roof opening. The downwardly depending flanges on the sliding panel preferably lie outside the upstanding flanges on the water-check tray and the locking devices are located outside the downwardly depending flanges in a space between the same and the longitudinal guide-members, which are located in the water-check tray. The downwardly depending flanges on the sliding panel perform several functions; in the first place they stiffen the panel and permit the employment of a panel consisting of a given thickness of metal which is light and easy to operate; in the second place they co-operate with the upstanding flanges on the water-check tray to ensure that no water is let by the roof in rainy weather; in the third place they exclude draughts, and in the fourth place they provide a very neat construction because no dark or inaccessible recesses are visible from the side of the body between the sliding panel and the water-check tray. When guide flanges in the water-check tray are located between the sides of the water-check tray and the parts of the panel which engage them such objectionable recesses are inevitable.

The sliding panel, owing to its lightness and owing to the overlapping engagement of the depending flanges thereon with the upstanding flanges on the water-check tray is particularly adapted for use in what are known as flush fitting roofs, that is to say roofs which are lowered to permit them to slide beneath the fixed portion of the roof and are lifted when in their closed position to bring them flush with the fixed portion of the roof. Owing to the overlapping flanges the rising and falling motion of the roof panel can be accomplished without exposing any undesirable spaces between the panel and the fixed portion of the body work as viewed from the inside of the vehicle.

The locking devices, which as above stated are preferably located outside the downwardly depending flange on the panel are connected to the operating means for the locking devices by actuating members extending through apertures cut in the downwardly depending flanges and this permits easy actuation of the locking devices from the inside of the vehicle body.

The following is a description by way of example of one specific construction in accordance with the invention, reference being had to the accompanying drawings in which:—

Figure 1 is a longitudinal section through the roof of a vehicle constructed in accordance with the invention taken upon the line 1—1 of Figure Figure 2 is a transverse section of the roof upon the line 2—2 of Figure 1, looking in the direction of the arrows;

Figure 3 is a similar section upon the line 3—3 of Figure 1;

Figure 4:
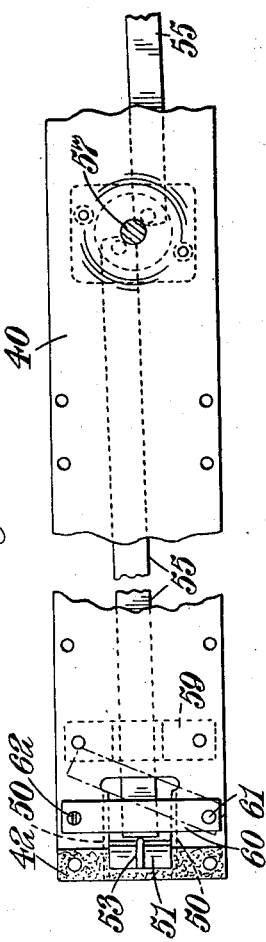
Figure 4 is an underside plan view of a part of the locking mechanism.

Referring to Figures 1 and 2, 11 represents a metal cant-rail at the side of a vehicle roof of all-metal construction, 12 represents the curved metal front of the roof and 13 a fixed metal roof panel covering the rear portion of the vehicle body. Between the fixed panel 13, the front 12 and the cant-rails 11 there is a rectangular roof opening 14 which is surrounded by a water-check tray 15. The water-check tray 15 has upstanding outer sides 16 which are welded to an overlapping edge 17 of the cant-rail 11 along longitudinal sides of the opening. At the front of the vehicle the tray has an upstanding wall 18 which is welded to an overlapping portion 19 of the front 12 in a similar way to the side walls 16. At the rear of the opening 14 the tray passes across the roof below but clear of the fixed panel 13 and is stiffened by an upstanding rear flange 20 (Figure 1).

The inner edges of the tray 15 along each side of the opening 14 are turned up to form upstanding side flanges 21. Across the front of the opening 14 the upstanding side flanges are joined by an upstanding inner front flange 22 having a forwardly bent stiffening flange 23 which constitutes its upper edge. A similar upstanding flange 24, constituting part of the water-check tray, extends across the rear edge of the opening 14 and joins at its ends the longitudinal side flanges 21. The flange 24 has a rearwardly bent flange 25 constituting its upper edge and this further helps to stiffen the transverse part of the tray at the rear of the opening, which is only supported at its ends, being clear of the roof panel 13 across the whole width of the roof.

Within the water-check tray 15 along each side 16 thereof there are secured angle members 26 having upper flanges 27 which are parallel to the upper surface of the roof. The flanges 27 constitute longitudinal guide-members for a sliding panel 30 and these longitudinal guide-members have, as will be seen, upper and lower guiding surfaces. The sliding panel 30 rests on the upper surfaces, as hereinafter described, and locking means engage the under surfaces.

Beneath the fixed panel 13 further guide-members 29 located similarly to the flanges 27 are provided. The guide-members 29 are upcurved at their front end where they terminate close below the front edge of the fixed rear panel 13, the upturned portion being marked 31 in the drawings. The guide flanges 29 are intended to support and guide the rear edge of the sliding panel 30, which engages with each of them by means of two pads 32, 33 carried on brackets 34 on a sliding panel. The pad 32 overlies the upper surface of the guide flange 29 and the pad 33 underlies the lower surface thereof. The pad 33 engages the flange in advance of the pad 32 and this difference in vertical location permits the pads to run up the ramps formed by the upturned portion 31 of the flanges 29. The rear edge of the roof panel 30 is downwardly curved as shown at 35 and it is the downwardly curved portion which carries the brackets 34. The downwardly curved rear edge 35 stiffens the panel 30 transversely and also fits below the front edge of the fixed portion 13 when the panel is brought forwardly into the closed position shown in Figure 1. In this position the panel is lifted by the ramp 31 flush with the fixed portion of the roof. If the panel is moved rearwardly the pads 32, 33 slide down the ramp 31 and permit the panel to drop sufficiently to slide underneath the fixed panel 13.

Viewing the sliding panel 30 in transverse section as shown in Figures 2 and 3 it will be seen that it comprises a single steel sheet pressed to conform to the curvature of the roof and doubled over inwardly at its side edges as shown at 36, Figure 2. The metal which is doubled beneath the side-edge at 36 is again bent downwardly to form a downwardly depending side flange 37 which lies close outside the upstanding flange 21 on the water-check tray 15. The downwardly depending flange 37 overlaps the flange 21, as best seen in Figure 1. It closes the space outside the flange 21 and beneath the sliding panel 30 as viewed from the interior of the vehicle thus preventing any unsightly pocket beneath the sliding panel as viewed from the interior of the vehicle. The flange 37 is deep enough to overlap the upstanding flange 21 even when the fixed panel is drawn forwardly into its raised and flush position with the roof closed, but there is a sufficient space in this position beneath the depending flange 37 and above the tray 15 to permit the sliding panel to drop when it is pushed rearwardly.

Welded to the underside of the panel 30 near the front edge thereof are a series of brackets 38, 39 which extend in a row across the panel from side to side. The brackets 38, 39 support a plate 40 in spaced relation beneath the panel. The plate 40 extends through an aperture 41 in each of the downwardly depending side flanges 37 and its ends overlie the upper surfaces of the guide flange 27 and carry cork pads 42 which run on the said flanges and support the front edge of the sliding panel thereon. Adjacent to the plate 40, but a little to the rear thereof, is a bracket 72 seen in Figures 1 and 3 which is spot-welded to the panel 30 and which extends through an aperture 43 in the flange 37 and carries a cork pad 44 resting on the upper surface of the guide-flange 27. This forms an additional support for the weight of the sliding panel. To the bracket 72 there is secured by screws 45 an adjustable bracket 46. The screws 45 work in a slot 47 in the adjustable bracket 46. The bracket 46 is bent down at right angles to its length as shown at 48 so that it may engage the edge of the longitudinal guide-member 27 and it is then extended outwardly beneath the guide-member 27 as shown at 49 and here it carries a cork pad to engage the under surface of the guide-member.

Figure 5:
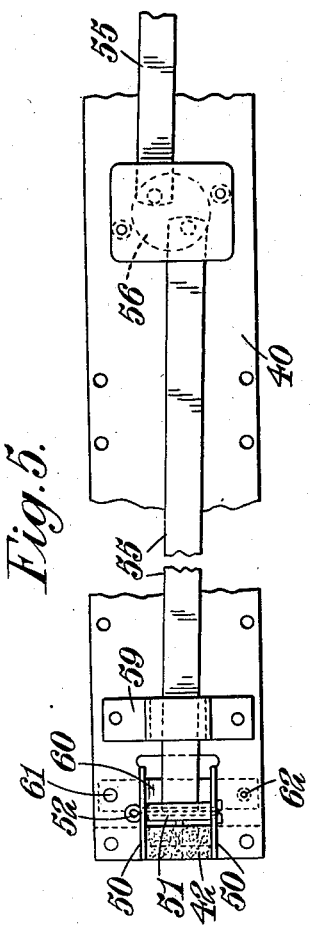
Figure 5 is an upper-side plan view of the same, viewed as removed from the sliding panel of the roof.

The plate 40 hereinabove referred to, which extends across the underside of the sliding panel 30 from side to side and rests at its ends on the guide-members 27, carries the locking devices. To this end the plate 40 is slotted at its two ends, the metal of the slot being bent upwardly to form upstanding flanges 50, as best seen in Figures 2 and 5. Between the upstanding flanges 50 there is pivoted a curved locking lever 51. The locking lever 51 depends from a pivot pin 52 inside the inner edge of the guide flange 27 and is curved around hook-wise so as to engage the underside of the flange 27. The lever is conveniently stiffened by a rib 53 down its centre as shown in Figure 4. The locking lever is mounted in front of a locking bolt 55, outward movement of which will cause it to press on the back of the locking lever 51 and make the lever engage the guide-member 27 and so lock the panel in position. There is a similar locking lever on each side of the panel and there are two locking bolts 55 which pass through the apertures 41 in the downwardly depending flanges 37 and extend towards the centre of the plate 40. At their inner ends they are pivoted to a crank plate 56 mounted on a spindle 57 of a locking handle 58. Rotation of the handle will shoot the bolts and lock the panel in position. The bolts 55 are guided by brackets 59 on the plate 40. In addition there is a plate 60 which is pivoted to the underside of the plate 40 at 61 just behind the hooked locking lever 51. The plate 60 can be secured in position behind the locking lever by a screw 62, but if the screw 62 is removed and the bolts 55 withdrawn sufficiently the locking lever can be hinged back out of engagement with the underside of the flange 27. If this is done and if the adjustable bracket 46 is unscrewed the front end of the panel can be lifted clear of its guides and the panel withdrawn from the roof by sliding the pads 32 off the front edges of the rear guides 29. This permits easy assembly and removal of the sliding panel, access to the adjustable bracket 46, and the screw 62 which holds the plate 60 being obtained from the inside of the vehicle body. The inside of the panel 30 is lined with roof fabric 63 and beneath the fixed panel constituting the rear part of the roof, the roof fabric 64 is stretched, being secured to the inside of the flange 24 of the rear part of the tray 15 and to the surrounding fixed portions of the roof. It will be understood, however, that this roof lining 64 can be omitted or may be secured to the underside of the fixed portion 13 of the roof if desired.

The front edge of the sliding panel 30 has a downwardly depending flange 65 similar to the side flanges 37 but sufficiently short to enable it to slide above the top flange 23 of the front portion of the water-check tray 15.

It will be observed that the sliding panel is stiffened along the side edges by the downwardly depending flanges 37, across the front edge by the downwardly depending flange 65, across the rear edge by the downcurved portion 35, as well as being stiffened transversely by the plate 40 which carries the locking devices. This permits other transverse members to be dispensed with on the sliding panel and makes for a very light construction and one of great compactness so that the space between the fixed panel 13 and the roof lining 64 can be reduced to a minimum.

It will be appreciated that when the bracket 46 is adjusted so that its downturned portion 48 lightly engages the inner edges of the guide flanges 27 this serves to centre the sliding panel 30 relatively to the roof opening 14 and to prevent the edges of the panel from touching the edges of the cant-rails 11 and that the adjustment of the bracket 46 permits such centering to be accurately effected notwithstanding any variations which may arise in manufacture in the location of the flanges 27. The sliding panel can therefore be made a close fit in the roof opening without risk of touching the sides thereof or of rattling, and this, combined with the close approach between the flanges 37 and 21, effectively excludes draughts and rain, while the locking devices are not affected in their operation by any of the adjustments aforementioned.

I claim:

1. In a vehicle body the combination of a roof, an opening therein, a water-check tray with a central opening below said roof opening, said tray being connected to said roof around its edges and having upstanding flanges along each side-edge of the opening in the tray, longitudinal guide-members carried by said water-check tray along each side-edge thereof, a sliding panel mounted to slide upon said guide-members and downwardly depending flanges upon said sliding panel spaced inwardly from the side-edges thereof so as to lie adjacent to and vertically overlap the upstanding flanges upon the tray.

2. In a vehicle body the combination of a roof having an opening therein, a water-check tray extending around the edges of said opening beneath the same and having upstanding flanges along its inner side-edges longitudinal guide-members in said water-check tray and spaced from said upstanding flanges, a sliding panel mounted upon said longitudinal guide members and downwardly depending flanges upon the sliding panel overlapping said upstanding flanges on the tray and located between the guide-members and said upstanding flanges.

3. In a vehicle body the combination of a roof, an opening therein, a water-check tray beneath said opening and extending around the sides thereof, upwardly extending flanges along each of the inner side-edges of said water-check tray, longitudinal guide-members in said water-check tray parallel with but spaced from said upstanding flanges, a sliding panel mounted upon said longitudinal guide-members, means to lower the rear edge of said sliding panel so that it can slide beneath the adjacent fixed portion of the roof and to raise said panel when it is in position to close said roof opening and downwardly depending flanges upon said sliding panel adjacent to said upwardly-extending flanges of said tray so as to overlap the same and close the space between the panel and said upstanding flanges when the panel is lifted in the closed position, said downwardly depending flanges being between the guide members and the inner side-edges of said tray.

4. In a vehicle body as claimed in claim 1, the provision of locking members upon the sliding panel comprising levers depending from the edges of the panel outside the downwardly depending flanges and curved to underlie the guide-members in the tray in combination with means upon the panel to operate the levers through apertures pierced in the downwardly depending flanges whereby said levers may be forced into engagement with the longitudinal guide members and the sliding panel may be locked into position as desired.

5. In a vehicle body as claimed in claim 2, the provision of locking members upon the sliding panel comprising levers depending from the edges of the panel outside the downwardly depending flanges and curved to underlie the guide-members in the tray in combination with means upon the panel to operate the levers through apertures pierced in the downwardly depending flanges whereby said levers may be forced into engagement with the longitudinal guide members and the sliding panel may be locked into position as desired.

6. In a vehicle body a combination as claimed in claim 2, wherein brackets are secured on the underside of the sliding panel, said brackets being adapted to engage the side-edges of the longitudinal guide-members and prevent lateral movement of the panel relatively thereto.

7. In a vehicle body a combination as claimed in claim 2, wherein adjustable brackets are secured on the underside of the sliding panel, said brackets being adapted to engage the side-edges of the longitudinal guide-members and prevent lateral movement of the panel relatively thereto.

8. In a vehicle body a combination as claimed in claim 2, wherein adjustable brackets are secured on the underside of the sliding panel, said brackets being adapted to engage the side-edges of the longitudinal guide-members and prevent lateral movement of the panel relatively thereto, and also being extended so as to engage the underside of said guide-members and prevent undesired lifting of the front-edge of the panel.

9. In a vehicle body the combination of a roof, an opening therein, a water-check tray beneath said opening and surrounding the sides thereof, longitudinal guides within said water-check tray at each side of the roof opening having guide surfaces spaced from the bottom of the water-check tray, a one-piece metal panel stiffened by downwardly depending flanges, said panel being mounted to slide on the longitudinal guides.

10. In a vehicle body a combination as claimed in claim 9, wherein means are provided for lowering said metal panel at its rear edge to permit it to slide beneath the fixed portion of the roof and for resting it flush with the roof when in closed position.

11. In a vehicle body a combination as claimed in claim 9, wherein said downwardly depending flanges are spaced inwardly from the side-edges of the panel, the guide-members are located in the tray outside the said flanges, locking members are provided to engage the guide-members and operating means for said locking members extend through apertures in the said flanges to actuating means therefor on the underside of the panel.

12. In a vehicle body the combination of a roof having an opening therein, a water-check tray extending around the edges of said opening beneath the same and having upstanding flanges along its inner side edges, longitudinal guide members each having a horizontal flange in said water-check tray and spaced from said upstanding flanges, a sliding panel mounted upon said longitudinal guide members, brackets secured to the underside of the front portion of the sliding panel, said brackets engaging the sides of said longitudinal guide members to prevent lateral movement of the panel relatively thereto, said brackets also engaging the underside of said horizontal flange to prevent undesired lifting of the front edge of the panel.

13. In a vehicle body the combination of a roof having an opening therein, a water-check tray extending around the edges of said opening beneath the same and having upstanding flanges along its inner side edges, longitudinal guide members each having a horizontal flange in said water-check tray and spaced from said upstanding flanges, a sliding panel mounted upon a horizontal surface of said longitudinal guide members, brackets secured to the underside of the front portion of the sliding panel, said brackets extending under horizontal flanges of said longitudinal guide members to engage the underside thereof and prevent undesired lifting of the front edge of the panel, said brackets also abutting vertically-extending surfaces of said guide members to prevent lateral movement of the panel relatively thereto.

JOHN KING.